United States Patent
Kim et al.

(10) Patent No.: US 9,608,274 B2
(45) Date of Patent: Mar. 28, 2017

(54) SODIUM SECONDARY BATTERY INCLUDING GRAPHITE FELT AS CURRENT COLLECTOR

(71) Applicant: SK Innovation Co., Ltd., Seoul (KR)

(72) Inventors: Young Shol Kim, Daejeon (KR); Ku Bong Chung, Daejeon (KR); Jeong Soo Kim, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 438 days.

(21) Appl. No.: 14/309,183

(22) Filed: Jun. 19, 2014

(65) Prior Publication Data

US 2014/0377637 A1  Dec. 25, 2014

(30) Foreign Application Priority Data

Jun. 20, 2013 (KR) .......................... 10-2013-0070812

(51) Int. Cl.

| | | |
|---|---|---|
| *H01M 4/66* | (2006.01) | |
| *H01M 4/70* | (2006.01) | |
| *H01M 10/04* | (2006.01) | |
| *H01M 10/054* | (2010.01) | |
| *H01M 10/0568* | (2010.01) | |
| *H01M 4/131* | (2010.01) | |
| *H01M 4/02* | (2006.01) | |

(52) U.S. Cl.
CPC .......... *H01M 4/663* (2013.01); *H01M 4/131* (2013.01); *H01M 4/70* (2013.01); *H01M 10/054* (2013.01); *H01M 10/0568* (2013.01); *H01M 10/0422* (2013.01); *H01M 2004/021* (2013.01)

(58) Field of Classification Search
None
See application file for complete search history.

(56) References Cited

U.S. PATENT DOCUMENTS

| | | | | |
|---|---|---|---|---|
| 5,234,778 A | * | 8/1993 | Wright ................. | H01M 4/661 429/103 |
| 2003/0054255 A1 | * | 3/2003 | Hidaka ................. | H01M 4/663 429/241 |
| 2010/0297537 A1 | * | 11/2010 | Coors .................... | C04B 35/01 429/532 |

FOREIGN PATENT DOCUMENTS

WO  WO 2011109815 A1 * 9/2011 ............ H01M 4/587

* cited by examiner

*Primary Examiner* — Daniel Gatewood
(74) *Attorney, Agent, or Firm* — The Webb Law Firm

(57) ABSTRACT

Provided is a sodium secondary battery including a graphite felt having a maximum porosity on a surface facing a solid electrolyte and a decreased porosity in a thickness direction, as a cathode current collector impregnated with an electrolyte.

11 Claims, 7 Drawing Sheets

SODIUM SECONDARY BATTERY INCLUDING GRAPHITE FELT AS CURRENT COLLECTOR

CROSS-REFERENCE TO RELATED APPLICATION

This application claims priority to Korean Patent Application No. KR 10-2013-0070812 filed Jun. 20, 2013, the disclosure of which is hereby incorporated in its entirety by reference.

TECHNICAL FIELD

The following disclosure relates to a sodium secondary battery, and more particularly, to a sodium secondary battery including a graphite felt as a cathode current collector.

BACKGROUND

As the use of new renewable energy is rapidly increasing, a demand for an energy storage device using a battery is rapidly increasing. Among such batteries, a lead battery, a nickel/hydrogen battery, a vanadium battery and a lithium battery may be used. However, the lead battery and the nickel/hydrogen battery have a very low energy density, and need a larger space for storing the same amount of energy. In addition, the vanadium battery has the problems of environmental pollution due to the use of a heavy metal-containing solution, and performance degradation due to the immigration of a small amount of a material between an anode and a cathode through a membrane separating the anode and the cathode, and thus, has not been commercialized on a large scale. The lithium battery having excellent energy density and output characteristic is technologically advantageous, but uneconomical to be used as a secondary battery for a large-scale power storage due to a resource scarcity of a lithium material.

In order to solve the foregoing problems, many attempts have been made to use sodium which is an abundant resource in earth as a material of the secondary battery. Among them, as disclosed in U.S. Patent Application Publication No. 20030054255, a sodium-sulfur battery using beta alumina having a selective conductivity for sodium ions, and having an anode impregnated with sodium, and a cathode impregnated with sulfur, is currently being used as a large-scale power storage device.

However, as to the existing sodium-based secondary battery such as the sodium-sulfur battery or a sodium-nickel chloride battery, considering the conductivity and melting points of the battery components, the sodium-nickel chloride battery should have an operating temperature of 250° C. or more, and the sodium-sulfur battery should have an operating temperature of 300° C. or more. Due to such problems, those batteries are disadvantageous in economic aspect in manufacture or operation, since temperature maintenance, sealability maintenance and safety of the batteries should be reinforced. In order to solve the foregoing problems, a room temperature-type, sodium-based battery is being developed, however, which has a very small output, and much less competent than a nickel-hydrogen battery or a lithium battery.

RELATED ART DOCUMENT

Patent Document

U.S. Patent Application Publication No. 20030054255

SUMMARY

An embodiment of the present invention is directed to providing a sodium secondary battery preventing capacity reduction during the repetition of charge/discharge cycles, being capable of operation at low-temperature, significantly improving output and a charge/discharge rate of the battery, maintaining a charge/discharge cycle characteristic stably for a long period, having improved battery life by preventing deterioration, and having improved battery stability.

In one general aspect, a sodium secondary battery includes a graphite felt having a maximum porosity on a surface facing a solid electrolyte and a decreased porosity in a thickness direction, as a cathode current collector impregnated with an electrolyte.

The graphite felt may have a porosity continuously decreased in a thickness direction.

The graphite felt may have a porosity discontinuously decreased in a thickness direction.

A difference between the maximum porosity (%) and the minimum porosity (%) in the graphite felt may be 1% to 98%.

The graphite felt may have the maximum porosity of 2% to 99%.

The sodium secondary battery of an exemplary embodiment of the present invention may further include a sodium ion conductive solid electrolyte separating an anode space and a cathode space, an anode positioned in the anode space and containing sodium, and a catholyte positioned in the cathode space, wherein the graphite felt is impregnated with the catholyte.

The sodium secondary battery may further include a cylindrical metal case of which one end is closed and the other end is open, and a cover coupled with the open end of the metal case, wherein the cathode space and the anode space may be separated by a tubular solid electrolyte of which one end is closed inserted into the metal case.

The graphite felt may have a cylindrical shape having a hollow, and the tubular solid electrolyte may be positioned in the hollow.

A facing surface of the surface facing the solid electrolyte of the graphite felt may contact the metal case.

The graphite felt may have a porosity decreased in a direction from a surface of the hollow side to an outer side surface.

The sodium secondary battery may further include a cathode including a transition metal adhered to or impregnated into the graphite felt.

The catholyte may include a metal halide which is a halide of at least one metal selected from a group consisting of transition metals and metals from Group 12 to Group 14; and a solvent dissolving the metal halide.

Metal ions of the metal halide contained in the catholyte may be electrodeposited on the cathode current collector as the metals at the time of being discharged, and the metals electrodeposited on the cathode current collector may be dissolved into the catholyte as the metal ions at the time of being charged.

Other features and aspects will be apparent from the following detailed description, the drawings, and the claims.

DETAILED DESCRIPTION OF EMBODIMENTS

Figure 1:
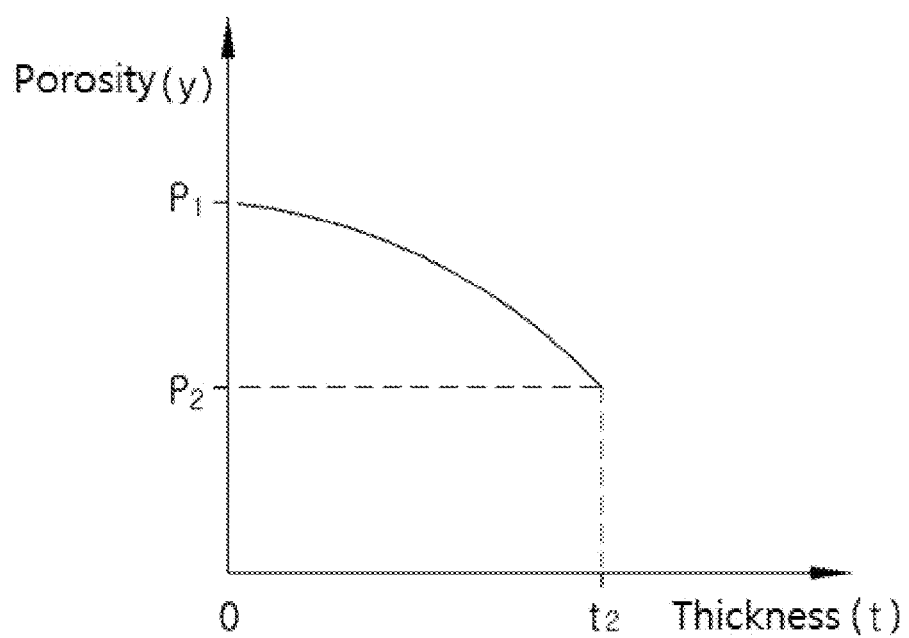
FIG. 1 is a graph illustrating a porosity depending on a thickness of the graphite felt in the sodium secondary battery according to an exemplary embodiment of the present invention.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the sodium secondary battery of the present invention will be described in detail with reference to the accompanying drawings. The drawings described below are provided by way of example so that the idea of the present invention can be sufficiently transferred to a person skilled in the art. Therefore, the present invention is not limited to the presented drawings below, and may be embodied in other forms. Also, the drawings presented below may be shown exaggerated in order to clarify the idea of the present invention. In addition, same reference numerals denote same elements throughout the specification.

Herein, technical terms and scientific terms used in the present specification have the general meaning understood by those skilled in the art to which the present invention pertains unless otherwise defined, and a description for the known function and configuration unnecessarily obscuring the gist of the present invention will be omitted in the following description and the accompanying drawings.

The sodium secondary battery according to the present invention includes a graphite felt having a maximum porosity on a surface facing a solid electrolyte and a decreased porosity in a thickness direction, as a cathode current collector. The sodium secondary battery according to an exemplary embodiment of the present invention may be a battery wherein metals are electrodeposited on the cathode current collector at the time of charge or discharge of the battery, specifically, a battery wherein metal ions contained in an electrolyte are electrodeposited on the cathode current collector as metals.

The graphite felt which is a cathode current collector is chemically stable since it has no reactivity with battery components such as an electrolyte, and may provide a large reaction area simultaneously with being impregnated with a large amount of electrolyte, owing to a high porosity.

However, in case of using the graphite felt having a single porosity as a cathode current collector, there are a risk of increasing a resistance of the current collector itself by the porosity of the graphite felt, and moreover, in case of demanding a current collector having a large area, also a risk of not forming a uniform electric potential on the surface of the current collector.

In addition, in case of using the graphite felt having a single porosity as a cathode current collector, when metals are electrodeposited on the graphite felt at the time of charge or discharge of the battery, the electrodeposition may be generated on the surface of the graphite felt, so that pores of the graphite felt may be blocked by the electrodeposited metals, and non-uniform electric field and electric potential caused by a porous structure may lead to different electrodeposition rates depending on scope to be electrodeposited by the graphite felt. In case where the pores on the surface of the graphite felt are preferentially blocked by the electrodeposition, a reaction area where a battery reaction may occur during a charging or discharging process may be significantly reduced. In case where non-uniform electrodeposition is intensified, electrodeposited metals may be desorbed in a particle state from the current collector, thereby causing permanent capacity loss, and non-uniform dissolution is generated by non-uniform electrodeposition, so that the metals which are yet to be dissolved during such dissolution process may be desorbed in a particle state from the current collector. Thus, as the charge/discharge cycles are repeated, the permanent capacity loss of the battery may become more serious.

The sodium secondary battery according to the present invention has chemically excellent stability, and adopts a graphite felt having a large reaction area and impregnated amount of an electrolyte as a cathode current collector, wherein the graphite felt has a maximum porosity on a surface facing a solid electrolyte, and a decreased porosity in a thickness direction, thereby preventing the non-uniform electrodeposition and dissolution of metals, and the blockage of pores positioned on the surface of the graphite felt.

The graphite felt having a maximum porosity on a surface facing a solid electrolyte (hereinafter, referred to as a first surface), and a porosity changed in a thickness direction, may provide a large nucleation site in an inner region of the graphite felt having a decreased porosity as compared with that on the first surface, and at the same time, maintain stable and high potential as compared with that of the first surface, thereby allowing nucleation of metals at the time of electrodeposition to be preferentially generated in the inner region of the graphite; and may allow the electrodeposition of metals to be carried out in a direction from the inner region to the first surface of the graphite in order, thereby preventing non-uniform electrodeposition. In addition, as the electrodeposition is preferentially generated in the inner region of the graphite, the pores on the surface of the graphite (the first surface) may be prevented from being blocked by electrodeposited metals, thereby stably maintaining a large reaction area of the graphite felt until the battery reaction is completed.

In this case, a thickness direction of the graphite felt may mean a vertical direction between the largest two surfaces of the graphite felt facing each other, and a vertical direction between a first surface which is a graphite surface facing a solid electrolyte and a second surface which is a facing surface of the first surface.

Herein, the porosity may be an apparent porosity, and may be measured according to ASTM C 1039-85.

As described above, the nucleation of a metal is preferentially carried out in the inside of the graphite felt having a relatively low porosity as compared with the surface of the graphite felt facing a solid electrolyte, and as the nucleation of a metal is carried out in a direction from the inside of the graphite felt to the first surface, the permanent desorption of metal particles from the current collector may be prevented, and a battery capacity may be stably maintained in spite of the repetition of charge/discharge cycles.

FIG. 1 is a graph illustrating a porosity of the graphite felt depending on a thickness (t), based on the first surface as a reference point (0), in the sodium secondary battery according to an exemplary embodiment of the present invention. As illustrated in FIG. 1, the graphite felt has a maximum porosity ($P_1$) on the first surface, and may have a porosity continuously decreased in a thickness direction. Herein, a porosity change may be linear or non-linear.

In case where the porosity is continuously decreased in a thickness direction, the graphite felt may have a maximum porosity ($P_1$ in FIG. 1) on the first surface, and a minimum porosity ($P_2$ in FIG. 1) on the facing surface of the first surface (the second surface, $t_2$ in FIG. 1), and thus, may have a difference of the porosities in the graphite felt, that is, [the maximum porosity (%)]−[the minimum porosity (%)] of 1% to 98%. In case where the porosity difference is less than 1%, the difference between the porosities of the first surface and the inside of the graphite felt is insignificant, so that there is a risk of active generation of metal electrodeposition on the first surface. In addition, in case where the porosity difference is above 98%, there are risks of increasing internal resistance of the battery due to increased resistance of the graphite felt itself, and of decreasing the reaction area of the graphite felt. In terms of causing the metal electrodeposition preferentially in the inner region of the graphite felt having a low porosity as compared with the first surface, and preventing an increase in the resistance of the graphite felt, [the maximum porosity (%)]−[the minimum porosity (%)] which is a difference of the porosities in the graphite felt may be 1% to 98%, specifically 5% to 95%, more specifically 10% to 90%. That is, $P_1-P_2$ may be 1% to 98%, specifically 5% to 90%, more specifically 10% to 80%.

In this case, the thickness of the graphite felt may be determined in consideration of the structure and the capacity of the sodium battery to be designed. As a specific and non-limited exemplary embodiment, the thickness of the graphite felt may be 0.1 cm to 20 cm.

In the sodium secondary battery according to an exemplary embodiment of the present invention, the porosity of the first surface may be 2% to 99%. Fluid mobility between the graphite felt and an electrolyte may be varied with the porosity of the first surface, and in case where the porosity on the first surface satisfies the above described range, the electrolyte may easily permeate the graphite felt, and a sodium ion flux generated at the time of the charging and discharging reaction of the battery may also smoothly flow. In terms of causing metal electrodeposition preferentially in the inner region of the graphite felt having a low porosity as compared with the first surface, and guaranteeing a smooth material migration to the graphite felt, the porosity of the first surface may be 2% to 99%, specifically 20% to 99%, more specifically 50% to 99%, still more specifically 80% to 99%.

Figure 2A:
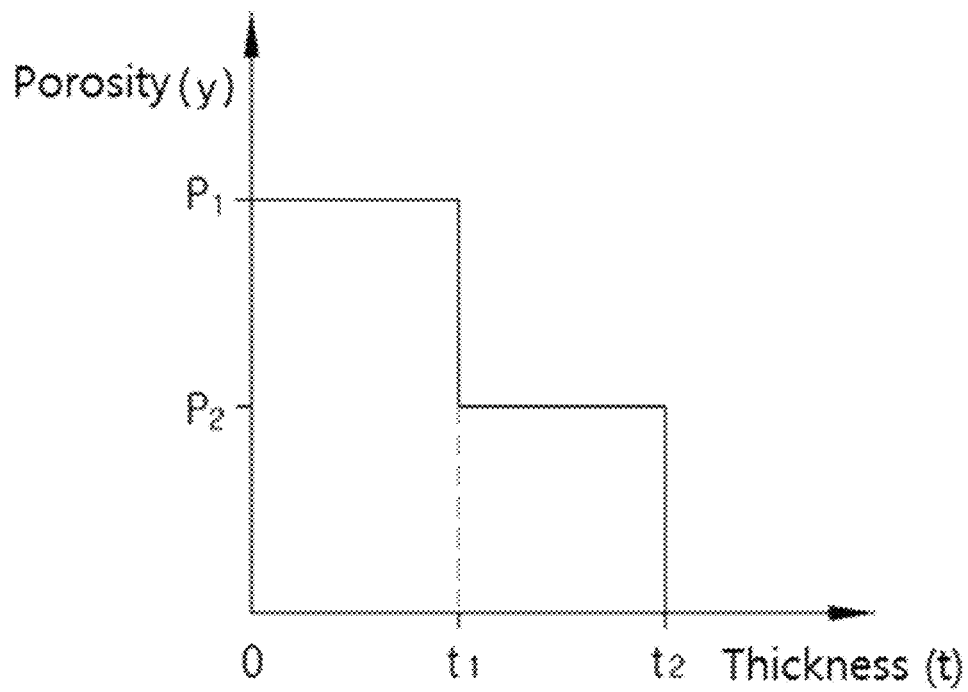
FIGS. 2(a) and 2(b) are another graphs illustrating a porosity depending on a thickness of the graphite felt in the sodium secondary battery according to an exemplary embodiment of the present invention.
Figure 2B:
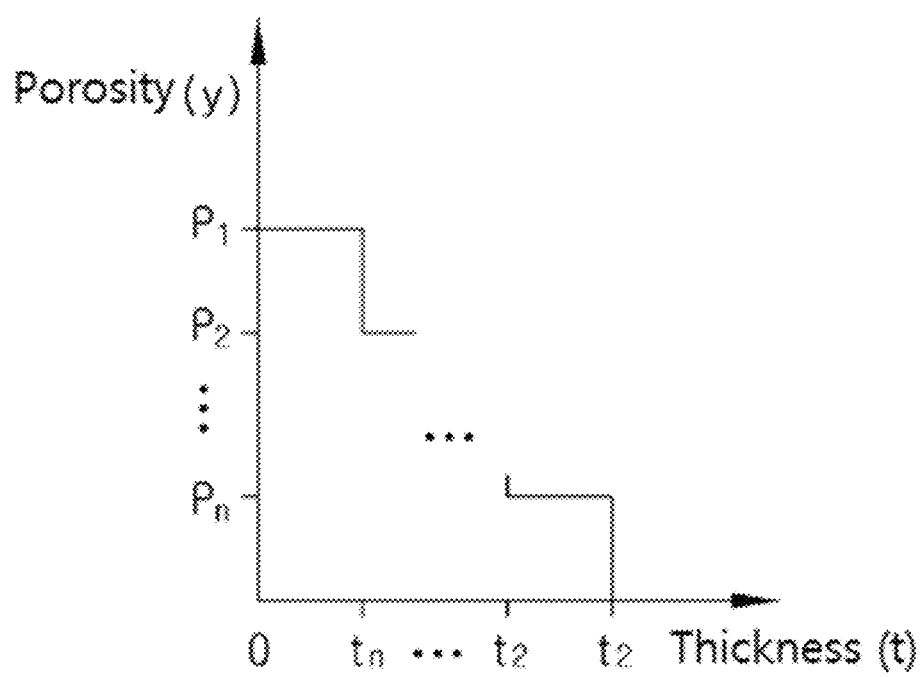

FIGS. 2(a) and 2(b) are graphs illustrating a porosity of the graphite felt depending on a thickness (t), based on a first surface as a reference point (0), in the sodium secondary battery according to an exemplary embodiment of the present invention. As illustrated in FIGS. 2(a) and 2(b), the graphite felt has a maximum porosity ($P_1$) on the first surface, and may have a porosity discontinuously decreased in a thickness direction. FIG. 2(a) is an example illustrating the case that a porosity is discontinuously decreased once, and FIG. 2(b) is an example illustrating the case that a porosity is discontinuously decreased n times (n is a natural number more than 1).

As illustrated in FIGS. 2(a) and 2(b), the graphite felt (cathode current collector) may be formed by stacking two or more graphite felts having different porosities on top of each other. Hereinafter, each of the graphite felts having different porosities from each other and forming a cathode current collector by being stacked on top of each other, is referred to as a porous felt, and a laminate formed by stacking the porous felts is referred to as a graphite felt, in order to avoid terminological confusion with the graphite felt used as a cathode current collector.

The graphite felt may be formed by stacking two or more porous felts having different porosities on top of each other, in order of porosity from high to low, or low to high.

As a specific example, the graphite felt may be formed by stacking two porous felts, a first porous felt, and a second porous felt.

As another specific example, the graphite felt may be formed by stacking a first porous felt, a second porous felt, and a k-th porous felt in order. Herein, k is a natural number of 3 to 1, 1 is a natural number of 4 to 10, the porosity of the first porous felt may be higher than the porosity of the second porous felt, the porosity of the second porous felt may be higher than the porosity of the k-th porous felt, and the porosity of the k-th porous felt may be higher than the porosity of the (k+1)-th porous felt.

As described above based on FIGS. 2(a) and 2(b), in case of forming the graphite felt by stacking porous felts having different porosities from each other, the high porosity of the porous felt forming the first surface (the first porous felt) allows sodium ions to smoothly flow also in the inside of the graphite. In addition, as the porosities of the porous felts forming the graphite felt are different from each other, a potential difference between the first surface and the inside of the graphite felt is effectively induced, thereby effectively causing more active and preferential metal electrodeposition in the inside of the graphite felt having a low porosity. In addition, as the porosity of the porous felt is controllable, using the porous felt having a single porosity as a raw material, by simply pressing, the graphite felt may be very easily and freely designed and manufactured.

In case where the porosity of the graphite felt is discontinuously changed in a thickness direction also, [the maximum porosity (%)]−[the minimum porosity (%)] which is a difference of the porosities in the graphite felt may be 1% to 98%, specifically 5% to 90%, more specifically 10% to 80%. That is, if a porous felt forming the second surface which is a facing surface of the first surface of the graphite felt is referred to as a second porous felt, [the porosity of the first porous felt]–[the porosity of the second porous felt] may be 1% to 98%, specifically 5% to 90%, more specifically 10% to 80%.

In addition, the porosity of the first porous felt which is a porous felt providing the first surface may be 3% to 99%, specifically 20% to 99%, more specifically 50% to 99%, still more specifically 80% to 99%.

Herein, in case of forming the graphite felt with three or more porous felts, a porosity difference between the first porous felt and the porous felt contacting the first porous felt may be 2% to 98%, specifically 5% to 90%, more specifically 10% to 80%, and a porosity difference between the porous felts contacted with each other except for the first porous felt may be 1% to 97%, more specifically 5% to 70%.

If the porous felts having different porosities from each other are stacked to form the graphite felt, the thickness of each porous felt ($t_1$, $t_2$–$t_1$ in FIG. 2(a), and $t_1$, $t_3$–$t_1$ in FIG. 2(b)) may be determined in consideration of the structure and capacity of the sodium battery to be designed. Herein, though the electrodeposition of transition metals is preferentially generated in the inside of the graphite felt, since the direction of supplying sodium ion flux is a direction to the first surface, the electrodeposition proceeds (that is, the nucleus of a transition metal grows) in a direction from the inside to the first surface of the graphite felt. Accordingly, in order to prevent the permanent capacity reduction, caused by the non-uniform electrodeposition of the metals on the first surface of the first porous felt, and then the desorption of the electrodeposited metals from the graphite felt as a particle form, the thickness of the first porous felt may be substantially 0.1 cm or more, more substantially 0.1 cm to 19 cm. As a specific and non-limited example, the thickness of another porous felts forming the graphite felt except for the first porous felt, may be independently of each other 0.1 cm to 19 cm.

Figure 3:
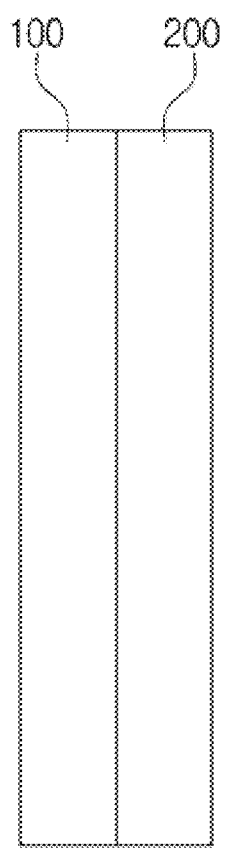
FIG. 3 is a cross-sectional view of the graphite felt in the sodium secondary battery according to an exemplary embodiment of the present invention.

FIG. 3 is a cross-sectional view of the graphite felt according to an exemplary embodiment of the present invention. As illustrated in FIG. 3, the graphite felt according to an exemplary embodiment of the present invention may consist of two porous felts having different porosities from each other, the first porous felt 100 and the second porous felt 200.

The porosity difference between the first porous felt 100 and the second porous felt 200 may be 1% to 98%, specifically 5% to 90%, more specifically 10% to 80%, and the porosity of the first porous felt 100 may be 2% to 99%, specifically 20% to 99%, more specifically 50% to 99%, still more specifically 80% to 99%. Such porosity difference between the porous felts and the porosity of the first porous felt are those which may maximize the reaction area where a battery reaction occurs by contact with an electrolyte, and guarantee the smooth impregnation with an electrolyte and flow of a sodium ion flux, while generating more preferential metal electrodeposition in a larger amount as compared with the first surface in the second porous felt 200.

Herein, the thicknesses of the first porous felt and the second porous felt may be determined in consideration of the structure and capacity of the sodium battery to be designed. As a specific and non-limited example, the thickness of the first porous felt may be substantially 0.1 cm or more, more substantially 0.1 cm to 19 cm, and the thickness of the second porous felt may be 0.1 cm to 19 cm.

Figure 4:
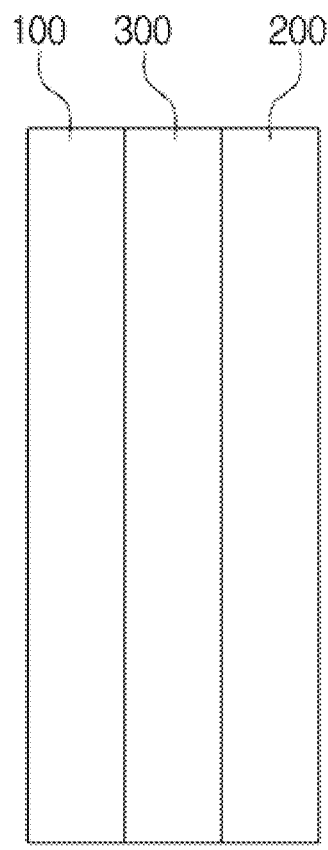
FIG. 4 is another cross-sectional view of the graphite felt in the sodium secondary battery according to an exemplary embodiment of the present invention.

FIG. 4 is another cross-sectional view of the graphite felt according to an exemplary embodiment of the present invention. As illustrated in FIG. 4, the graphite felt according to an exemplary embodiment of the present invention may be formed by stacking three porous felts having different porosities with one another, the first porous felt 100, the third porous felt 300, and the second porous felt 200 in order. Herein, the third porous felt 300 may have a porosity between the porosities of the first porous felt 100 and the second porous felt 200.

As illustrated in FIG. 4 of the exemplary embodiment, the graphite felt may secure the fluid flowability more effectively, flow of a sodium ion flux, and a large reaction area by the first porous felt 100 having the maximum porosity among those of the porous felts, provide a large nucleation site of a metal electrodeposited by the third porous felt 300 and the second porous felt 200, decrease the resistance of the graphite felt itself by the second porous felt 200, and provide more uniform and stable electric potential and field for the third porous felt 300 and the first porous felt 100. That is, as shown in FIG. 4, as the porosity is decreased in a thickness direction, non-uniformly and multi-stepwisely, the loss of an electric potential applied in the outside of the battery or an electric potential generated in the battery may be minimized.

In order to effectively cause the reduced resistance of the graphite felt itself, increased reaction area of the graphite felt, and the metal electrodeposition in the graphite felt, as described above, the porosity of the first porous felt may be 3% to 99%, specifically 20% to 99%, more specifically 50% to 99%, still more specifically 80% to 99%; the porosity difference between the first porous felt and the third porous felt may be 2% to 98%, specifically 5% to 90%, more specifically 10% to 80%; and the porosity difference between the third porous felt and the second porous felt may be 1% to 97%, more specifically 5% to 90%. Herein, the thicknesses of the first porous felt, the third porous felt and the second porous felt may be determined in consideration of the structure and capacity of the sodium battery to be designed. As a specific and non-limited example, the thickness of the first porous felt may be substantially 0.1 cm or more, more substantially 0.1 cm to 19 cm, and the thicknesses of the second porous felt and the third porous felt may be independently of each other 0.1 cm to 19 cm.

In the sodium secondary battery according to an exemplary embodiment of the present invention, the cathode current collector including the graphite felt serves to collect or supply an electric charge (electrons), and perform an electrical connection with the outside of the battery, and such electrical connection with the outside of the battery may be performed through the second surface which is the facing surface of the first surface of the graphite felt. Specifically, the cathode current collector may include the graphite felt and a metal film contacting the second surface of the graphite felt, and the electrical connection with the outside of the battery may be performed by the metal film contacting the second surface. Herein, the metal film contacting the second surface may be a metal film independently equipped for the cathode current collector, or a portion of a conventional component of the battery. Herein, the conventional component of the battery may include a metal battery case, and if the metal film is a portion of the battery case, the case that the second surface of the graphite felt is positioned to be contacted with the battery case may be included.

The sodium secondary battery according to an exemplary embodiment of the present invention may include a sodium ion conductive solid electrolyte separating an anode space and a cathode space, an anode positioned in the anode space and containing sodium, and a catholyte positioned in the cathode space, wherein the graphite felt may be impregnated with the catholyte. That is, the sodium secondary battery according to an exemplary embodiment of the present invention may include a sodium ion conductive solid electrolyte separating an anode space and a cathode space, an anode positioned in the anode space and containing metal sodium, and a graphite felt having a maximum porosity on a surface facing a solid electrolyte and a decreased porosity in a thickness direction, as a cathode current collector impregnated with a catholyte positioned in the cathode space.

The sodium secondary battery according to an exemplary embodiment of the present invention may have a plate-type structure or a tube-type structure, depending on a shape of the sodium ion conductive solid electrolyte (hereinafter, referred to as solid electrolyte) separating and dividing the anode space and the cathode space, but any structure commonly known in the art of the sodium secondary battery field may be used.

Figure 5:
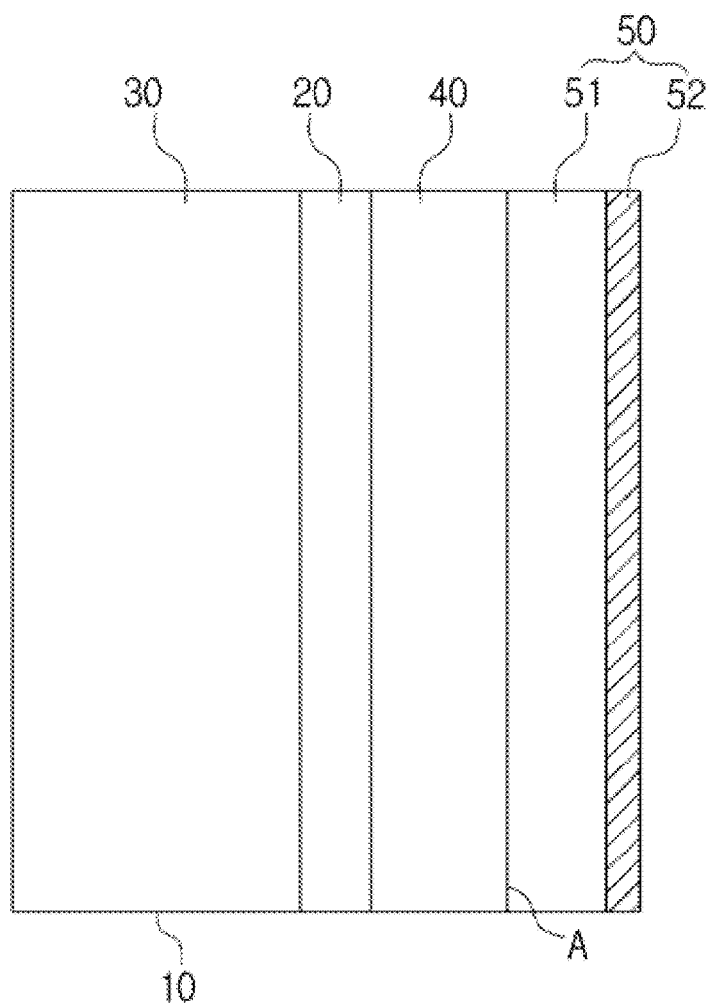
FIG. 5 is a cross-sectional view of the sodium secondary battery according to an exemplary embodiment of the present invention.

FIG. 5 is a cross-sectional view of the case that the sodium secondary battery according to an exemplary embodiment of the present invention has a plate-type structure, based on the case that an anode active material is molten sodium. As illustrated in FIG. 5, the sodium secondary battery according to an exemplary embodiment of the present invention may include a battery case 10 separating the components of the battery from the outside, a solid electrolyte 20 dividing the inside space of the battery case into a cathode space and an anode space and separating them, an anode 30 positioned in the anode space and containing sodium, a catholyte 40 positioned in the cathode space, and a cathode current collector 50 including the said graphite felt 51 impregnated with the catholyte. Herein, the first surface A which is the surface of the graphite felt contacting the catholyte, may be the surface facing a solid electrolyte, and the graphite felt may have a porosity continuously or discontinuously decreased in a direction from the surface facing a solid electrolyte to a facing surface thereof. In addition, as described above, the cathode current collector 50 may further include a metal film 52, and the metal film 52 may be positioned to be contacted with the facing surface of the first surface of the graphite felt 51. In addition, though not shown in the drawings, for an electrical connection of the outside of the battery and the anode and a flow of an electric charge (for examples, electrons), it goes without saying that an anode current collector inserted in molten sodium which is an anode active material, may further equipped in the anode space.

Figure 6:
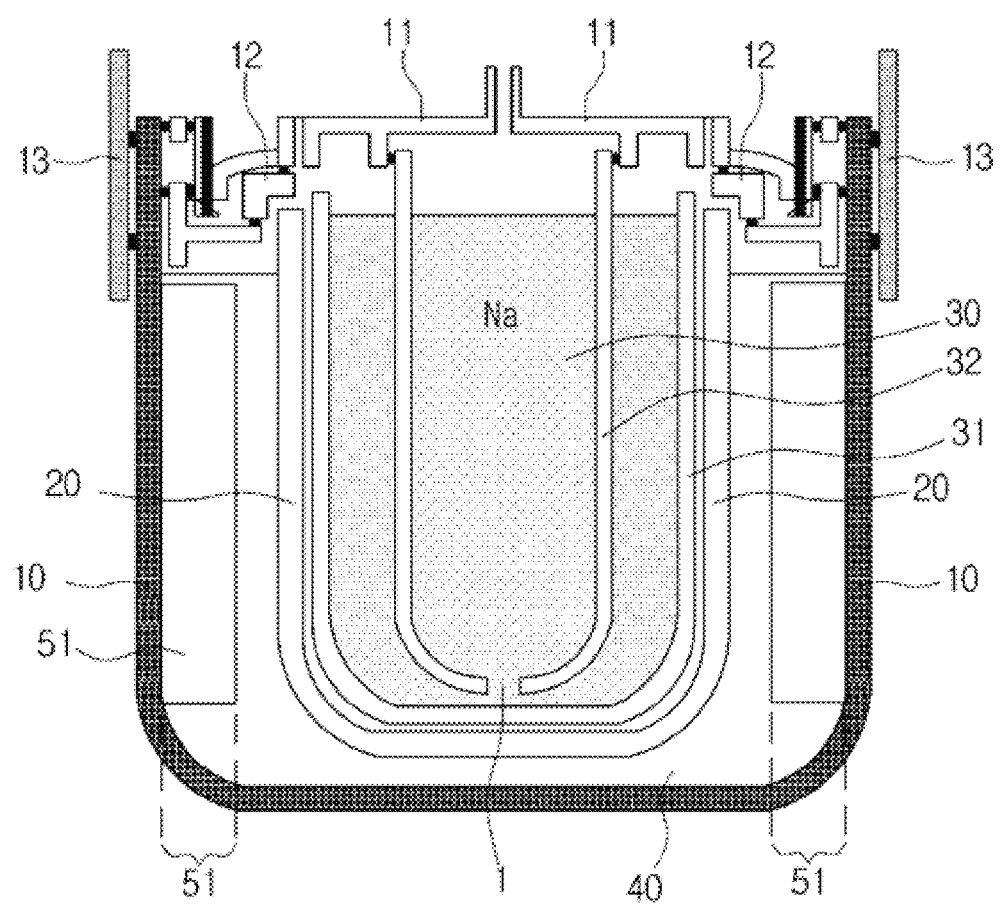
FIG. 6 is another cross-sectional view of the sodium secondary battery according to an exemplary embodiment of the present invention.

FIG. 6 is a cross-sectional view illustrating the structure of the sodium secondary battery according to an exemplary embodiment of the present invention, based on the case that an anode active material is molten sodium. FIG. 6 shows an example of the tube-type sodium secondary battery, but it goes without saying that the present invention is in no way limited by such physical shape of the battery, and the sodium secondary battery of the present invention may have the plate-type structure as shown in FIG. 5, or a general sodium-based battery structure.

FIG. 6 shows an example illustrating the structure of the sodium secondary battery according to an exemplary embodiment of the present invention. As illustrated in FIG. 6, the sodium secondary battery according to an exemplary embodiment of the present invention may include a cylindrical metal housing 10 (a battery case) of which lower end is closed and upper end is open, and a tubular solid electrolyte 20 (hereinafter, referred to as a solid electrolyte tube) of which lower end is closed, a safety tube 31, and a wicking tube 32, placed in the inside of the metal housing 10, and positioned in order from the outer side to the inner side of the metal housing 10, respectively.

Specifically, the wicking tube 32, positioned on the innermost side, that is a center of the metal housing 10 may have a tube shape having a through hole 1 formed on a lower end, and the safety tube 31, positioned on the outer side of the wicking tube 32 may have a structure surrounding, at a certain distance from, the wicking tube 32.

An anode 30 containing molten sodium, equipped in the inside of the wicking tube 32 may have a structure filling an empty space between the wicking tube 32 and the safety tube 31 via a through hole 1 formed on the lower part of the wicking tube 32.

A dual structure of the wicking tube 32 and the safety tube 31 may prevent a violent reaction between an anode material and a cathode material at the time of breakage of the tubular solid electrolyte 20, and maintain the level of the molten sodium constantly even at the time of discharge by a capillary force.

The tubular solid electrolyte 20 is positioned on the outer side of the safety tube 31 to surround the safety tube 31, and may be a tube-shaped solid electrolyte having selective permeability to sodium ion ($Na^+$).

In the space between the tubular solid electrolyte 20 surrounding the safety tube 31 and the metal housing 20, a catholyte 40 and a cathode current collector 50 may be equipped.

That is, the sodium secondary battery according to an exemplary embodiment of the present invention has a concentric structure wherein the wicking tube 32, the safety tube 31, the tubular solid electrolyte 20, and the metal housing 10 are positioned in order from the inner side to the outer side, and in the inside of the wicking tube 32, the anode 30 containing molten sodium is supported, and in the space between the tubular solid electrolyte 20 and the metal housing 10, the catholyte 40 is equipped, and the cathode current collector 50 is equipped so as to be impregnated with the catholyte 40.

As illustrated in FIG. 6, based on a charged state, the catholyte 40 and the cathode current collector 50 may be positioned in the cathode space, and based on a discharged state, the catholyte 40 and the cathode current collector 50 having metals electrodeposited on open pores in the graphite felt 51 may be positioned in the cathode space.

As illustrated in FIG. 6, the graphite felt 51 positioned in the cathode space of the metal housing 10 may have the second surface which is the facing surface of the first surface, positioned in contact with the inner wall of the metal housing 10. In this case, the metal housing 10 may, of course, serve as a case, and at the same time, as a conductor for an electrical connection with the outside of the battery on the anode side, and to apply an external electric potential to the graphite felt 51.

FIG. 6 shows a form of filling a certain part of the cathode space with the graphite felt, but as the catholyte permeates the pores of the graphite felt by the porosity of the graphite felt, the entire of the cathode space may be, of course, filled with the graphite felt. Specifically, a separation space between the cathode side of the tubular solid electrolyte 20 and an inner wall side of the metal housing 10 may be partially or entirely filled with the graphite felt.

Specifically, the graphite felt may have a cylindrical shape having a hollow, and the solid electrolyte, specifically the tubular solid electrolyte 20 may be positioned in the hollow of the graphite felt. The first surface of the graphite felt in contact with the catholyte, may be a surface facing the solid electrolyte. Accordingly, the surface on the hollow side of the graphite felt 51 may be the first surface. Since the tubular solid electrolyte 20 positioned in the hollow of the graphite felt 51 is contacted with the first surface of the graphite felt 51, the cathode space may be entirely filled with the graphite felt 51, and since the first surface of the graphite felt 51 and the tubular solid electrolyte 20 are separated at a certain distance, the cathode space may be partially filled with the graphite felt. In this case, the second surface of the graphite felt may be, of course, contacted with the inner side of the metal housing.

In case where the graphite felt has a cylindrical shape having a hollow, the thickness direction of the graphite may correspond to the shortest direction between the cathode side of the tubular solid electrolyte 20 and the inner wall side of the metal housing 10. Accordingly, the graphite felt having decreased porosity in a thickness direction may have decreased porosity in a direction from a surface of the hollow side (the first surface) to an outer side surface (the second surface).

Figure 7:
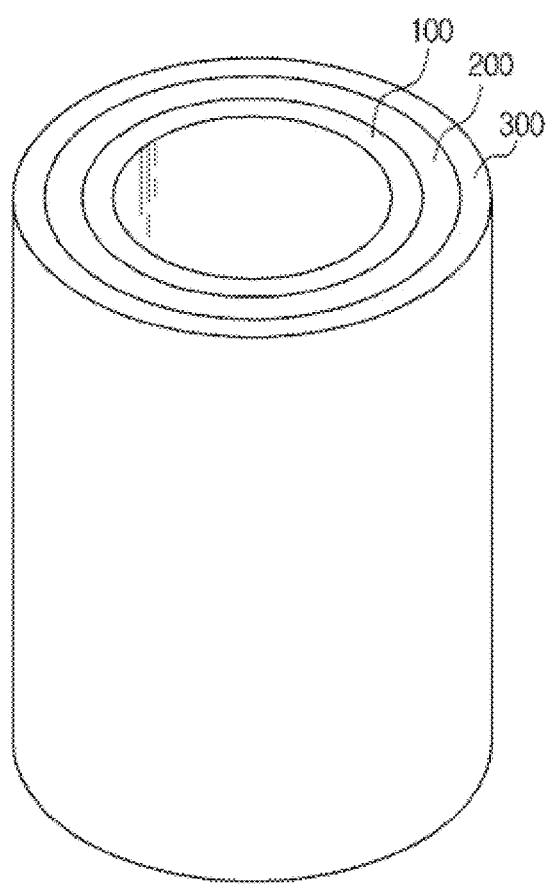
FIG. 7 is a perspective view of the graphite felt in the sodium secondary battery according to an exemplary embodiment of the present invention.

In case where the porosity is discontinuously decreased, as illustrated in FIG. 7, cylindrical-shaped porous felts 100, 200 and 300 having different porosities and diameters from each other may form a concentric structure, and be contacted with each other. The porous felt having the highest porosity among those porous felts may be positioned in the innermost side, the porous felt having the lowest porosity may be positioned in the outermost side, and the porous felt(s) positioned between the innermost side and the outermost side may be positioned in order of increased porosity from the outer side to the center, depending on the porosity of each porous felt.

The sodium battery according to an exemplary embodiment of the present invention may further include a cover 11 positioned on the upper part of the metal housing 10 to close the inside of the metal housing, an insulator 12 having a ring shape and being positioned on the upper side of the metal housing 10 to electrically insulate the space between the metal housing 10 and the tubular solid electrolyte 20, and an electrode terminal 13 positioned on the upper end circumference of the metal housing 10. In addition, in order to minimize the evaporation of a liquid phase, the internal pressure of the battery sealed by the cover 11 immediately after manufacture may be 15 psi or more, and it goes without saying that the cathode current collector 50, specifically the second surface of the graphite felt 51 is electrically connected with the metal housing 10. In addition, though not shown in the drawings, a general anode current collector may be, of course, inserted via a through-hole of the cover 11, so that a certain part of the anode current collector is impregnated with the anode active material containing molten sodium supported in the inside of the wicking tube 32.

The sodium secondary battery according to an exemplary embodiment of the present invention may include an anode containing sodium, a cathode being impregnated with a catholyte and including the graphite felt as a cathode current collector, and a sodium ion conductive solid electrolyte separating the anode and the catholyte. That is, the sodium secondary battery according to an exemplary embodiment of the present invention may include a sodium ion conductive solid electrolyte separating an anode space and a cathode space, an anode positioned in the anode space and containing sodium, a catholyte positioned in the cathode space, and a cathode including a cathode current collector being impregnated with the catholyte and including the above described graphite felt.

The sodium secondary battery according to an exemplary embodiment of the present invention may include a cathode wherein metals are adhered to or impregnated into the cathode current collector including the above described graphite felt, and the cathode may be impregnated with the catholyte. As described above, the sodium secondary battery according to an exemplary embodiment of the present invention may be a battery wherein at the time of charging/discharging reaction of the battery, metal ions present in the catholyte are combined with electrons to be electrodeposited on the cathode current collector, and a reaction where electrodeposited metals lose electrons and are dissolved in the catholyte as metal ions occurs. Accordingly, in case where the metals participating in the battery reaction are contained in the catholyte as ions, the catholyte and the cathode current collector impregnated with the catholyte may form the cathode, and in case where the metals participating in the battery reaction are electrodeposited on the cathode current collector, the cathode current collector having metals adhered (electrodeposited) thereto or impregnated thereinto may form the cathode.

Specifically, the sodium secondary battery according to an exemplary embodiment of the present invention may be a battery wherein in the charge or discharge process of the battery, metals are electrodeposited on the cathode, specifically in the process of discharge of the battery, metals are electrodeposited on the cathode. Herein, the metal to be electrodeposited may be at least one metal selected from a group consisting of transition metals and metals from Group 12 to Group 14.

More specifically, the electrochemical (charging/discharging) reaction of the battery may consist of sodium; at least one metals selected from a group consisting of transition metals and metals from Group 12 to Group 14 (hereinafter, referred to as a cathode active metal); and halogen, and the catholyte may contain a solvent dissolving sodium halide and the cathode active metal halide, and halides of at least one metal selected from a group consisting of alkali metals, transition metals and metals from Group 12 to Group 14.

That is, the sodium secondary battery according to an exemplary embodiment of the present invention may include an anode containing sodium; a catholyte containing a solvent dissolving an alkali metal halide and an cathode active metal halide; a cathode including the graphite felt as a cathode current collector, and being impregnated with the catholyte; and a sodium ion conductive solid electrolyte separating the anode and the catholyte.

Herein, the alkali metal may include lithium (Li), sodium (Na) and potassium (K), the transition metal may include titanium (Ti), vanadium (V), chromium (Cr), manganese (Mn), iron (Fe), cobalt (Co), nickel (Ni) and copper (Cu), and the metal from Group 12 to Group 14 may include zinc (Zn), aluminum (Al), cadmium (Cd) and tin (Sn).

The sodium secondary battery according to an exemplary embodiment of the present invention is charged by the following Reaction Formula 1, and discharged by the following Reaction Formula 2. Sodium halide and cathode active metal halide in Reaction Formulae 1 and 2 may be in a liquid state dissolved in the catholyte at the time of charge and discharge of the battery.

$$m\text{NaX} + M \rightarrow m\text{Na} + MX_m \quad \text{[Reaction Formula 1]}$$

$$m\text{Na} + MX_m \rightarrow m\text{NaX} + M \quad \text{[Reaction Formula 2]}$$

wherein, M is at least one metals selected from a group consisting of transition metals and metals from Group 12 to Group 14 (cathode active metals); X is a halogen element; and m is a natural number of 1 to 4. Specifically, m in Reaction Formulae 1 and 2 may be a natural number corresponding to a positive valence of metal (M).

Specifically, the sodium secondary battery according to an exemplary embodiment of the present invention, based on the charged state of the battery by the charging reaction according to Reaction Formula 1, the cathode may be the graphite felt and the catholyte themselves. That is, based on the charged state, the cathode in a solid state may be formed by only a cathode current collector. Based on the discharged state of the battery by the discharging reaction according to Reaction Formula 2, the cathode may be the cathode current collector including the graphite felt having a cathode active metal from the catholyte electrodeposited thereon, that is, the graphite felt having a cathode active metal adhered thereto or impregnated thereinto by the electrodeposition of the cathode active metal.

In the sodium secondary battery according to an exemplary embodiment of the present invention, as charging/discharging is repeated, ionization and reduction of the metals wherein the cathode active metals electrodeposited on the graphite felt which is a current collector (cathode current collector) are dissolved in the catholyte as cathode active metal ions, and the dissolved cathode active metal ions are electrodeposited on the graphite felt which is the current collector (cathode current collector), are repetitively carried out.

In addition, in the description of the sodium secondary battery according to an exemplary embodiment of the present invention, for clearer understanding, the cathode and the charging/discharging reaction were specified, based on the reaction product or material at the time of charging/discharging reaction of Reaction Formulae 1 and 2 (sodium halide, cathode active metal halide, etc.). However, according to the present invention, as the reaction products of sodium halide and cathode active metal halide except for the metals to be electrodeposited (electroplated) are all in the state of being dissolved in a solvent, it goes without saying that sodium halide may be interpreted as a sodium ion or a halide ion, and cathode active metal halide may be interpreted as at least one metals selected from a group consisting of transition metals and metals from Group 12 to Group 14 (cathode active metals).

As described above, as the cathode current collector includes the graphite felt, a very large reaction area caused by a very high porosity may be provided, and a large amount of catholyte may be inserted into the graphite felt. As the graphite felt has a continuously or discontinuously decreased porosity in a thickness direction from the surface on the solid electrolyte side (the first surface) which transports sodium ions from anode to cathode, to the second surface which is a facing surface of the first surface, the metal electrodeposition on the inside of the graphite felt is caused, so that the permanent capacity reduction by the non-uniform metal electrodeposition and the removal of the electrodeposited metal may be prevented, and a large reaction area may be maintained by the graphite felt during the entire charge/discharge process of the battery.

In addition, a non-uniform electric field or potential may be prevented from being formed on the first surface by a preferential cathode active metal electrodeposition on the inside of the graphite felt.

In the sodium secondary battery according to an exemplary embodiment of the present invention, the concentration of an active material including cathode active metal halide and/or sodium halide dissolved in a solvent of the catholyte, is directly linked to the amount of the material capable of participating in an electrochemical reaction of the battery, and may have an effect on an energy capacity per unit volume of the battery and an ion (including sodium ion) conductivity in the catholyte.

In the sodium secondary battery according to an exemplary embodiment of the present invention, the catholyte may contain 0.1 to 10 molar concentration (M), substantially 0.5 to 10M, more substantially 1 to 6M, still more substantially 2 to 5M of the active material.

Specifically, in the sodium secondary battery according to an exemplary embodiment of the present invention, the catholyte may contain 0.1 to 10M, substantially 0.5 to 10M, more substantially 1 to 6M, still more substantially 2 to 5M of the cathode active metal halide. Depending on the charged or discharged state of the battery, the cathode active metal may be present in the catholyte in an ion state, or electrodeposited on the cathode current collector, thereby changing a concentration of the cathode active metal ion in the catholyte. Such concentration of cathode active metal halide in the catholyte may be the concentration based on the charged state.

If the concentration of the cathode active metal halide based on the charged state is too low, that is, less than 0.1M, a conductivity of the ions participating in the electrochemical reaction of the battery such as sodium ions may drop, thereby reducing a battery efficiency, or the capacity of the battery itself may be too low. In addition, if the concentration of the cathode active metal halide is more than 10M, the conductivity of the sodium ion may be also decreased by metal ions having the same type of electric charge as a sodium ion. However, an additive which does not participate in a net ionic equation of the battery, and may increase the conductivity of the sodium ion, such as an excess amount of sodium halide as described below, may be further added, to control the ion conductivity in the catholyte, and of course, the concentration of cathode active metal halide may be controlled depending on the use and the capacity to be designed of the battery.

In the sodium secondary battery according to an exemplary embodiment of the present invention, according to the Reaction Formula 2 as described above, the concentration of sodium halide may be also determined by the concentration of cathode active metal halide in the catholyte, however, in order to improve the conductivity of the sodium ion in the catholyte, the cathode may further include sodium halide together with cathode active metal halide, based on the charged state.

Specifically, according to an exemplary embodiment of the present invention, if the charge/discharge of the battery in Reaction Formulae 1 and 2 is carried out, in order to improve the conductivity of the sodium ion and induce a more rapid charging or discharging reaction, the sodium ion and the halide ion may be contained in more amount than the amount determined by the discharging reaction according to Reaction Formula 2, in the catholyte containing a constant concentration of the cathode active metal ions.

Accordingly, the catholyte may contain cathode active metal halide and sodium halide dissolved in the solvent. Specifically, the catholyte in the charged state may contain cathode active metal halide and sodium halide dissolved in the solvent, and accordingly, the liquid cathode in the charged state may contain metal ions, sodium ions, and halide ions.

In the sodium secondary battery according to an exemplary embodiment of the present invention, the catholyte in the charged state may further contain 0.1 to 3M of sodium halide, based on 1M of cathode active metal halide. Through the amount (mol ratio) of sodium halide based on cathode active metal halide, the conductivity of sodium ions in the catholyte may be improved, the charging/discharging reaction of Reaction Formulae 1 and 2 may be effectively carried out in a short time, and moreover, in case where a battery operating temperature is low also, the conductivity of sodium ions and the reaction rate may be guaranteed.

In the sodium secondary battery according to an exemplary embodiment of the present invention, the cathode active metal halide may be defined by the following Chemical Formula 1:

MX$_m$                         [Chemical formula 1]

wherein, M is one or more selected from the group consisting of nickel (Ni), iron (Fe), copper (Cu), zinc (Zn), cadmium (Cd), titanium (Ti), aluminum (Al) and tin (Sn); X is one or more selected from the group consisting of Iodine (I), brome (Br), chlorine (Cl) and fluorine (F); and m is a natural number of 1 to 4. Herein, m may be a natural number corresponding to the valence of the metal.

In the sodium secondary battery according to an exemplary embodiment of the present invention, alkali metal halide may be sodium halide, and sodium halide may be defined by the following Chemical Formula 2:

NaX                            [Chemical formula 2]

wherein, X is one or more selected from the group consisting of iodine (I), brome (Br), chlorine (Cl) and fluorine (F).

Specifically, in the sodium secondary battery according to an exemplary embodiment of the present invention, the solvent of the cathode may be any solvent dissolving both metal halide and sodium halide, but in terms of improvement of the ionic conductivity of potassium ions, stability of a charge/discharge cycle characteristic, and improvement of a preserve characteristic capable of preventing a self-discharge, a nonaqueous organic solvent, an ionic liquid or the mixed liquid thereof.

The nonaqueous organic solvent may be one or more selected from the group consisting of alcohol-based, polyhydric alcohol-based, heterocyclic hydrocarbon-based, amide-based, ester-based, ether-based, lactone-based, carbonate-based, phosphate-based, sulfone-based and sulfoxide-based; and the ionic liquid may be one or more selected from the group consisting of imidazolium-based ionic liquid, piperidinium-based ionic liquid, pyridinium-based ionic liquid, pyrrolydinium-based ionic liquid, ammonium-based ionic liquid, phosphonium-based ionic liquid and sulfonium-based ionic liquid.

Specifically, in the sodium secondary battery according to an exemplary embodiment of the present invention, the nonaqueous organic solvent maintaining a liquid state stably under the battery operating temperature and pressure, allowing sodium ions introduced through a solid electrolyte to be easily diffused, not generating an undesired side reaction, having stable solubility in metal halide and sodium halide, carrying out charging/discharging cycles stably for a long time, and having an excellent preserve characteristic, may include, for example, one or more organic solvents selected from the group consisting of the following:

1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 1,5-hexanediol, 1,6-hexanediol, 1,8-octanediol, 1,10-decanediol, 1,12-dodecanediol, 2,2,4,4-tetracyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, glycerol, ethylene glycol, diethylene glycol, triethylene glycol, tetraethylene glycol, polyethylene glycol, propylene glycol, dipropylene glycol, tripropylene glycol, polypropylene glycol, formamide, N,N-dimethyl formamide, N,N-dimethyl acetamide, N,N-diethyl acetamide, N,N-dimethyl trifluoroacetamide, hexamethylphosphoramide, acetonitrile, propionitrile, butyronitrile, α-terpineol, β-terpineol, dihydroterpineol, N-methyl-2-pyrrolidone (NMP), dimethylsulfoxide, pyrrolidine, pyrroline, pyrrole, 2H-pyrrole, 3H-pyrrole, pyrazolidine, imidazolidine, 2-Pyrazoline, 2-imidazoline, 1H-imidazole, triazole, isoxazole, oxazole, thiazole, isothiazole, oxadiazole, oxatriazole, dioxazole, oxazolone, oxathiazole, imidazoline-2-thione, thiadiazole, triazole, piperidine, pyridine, pyridazine, pyrimidine, pyrazine, piperazine, triazine, morpholine, thiomorpholine, indole, isoindole, indazole, benzisoxazole, benzoxazole, benzothiazole, quinoline, isoquinoline, cinnoline, quinazoline, quinoxaline, naphthyridine, phthalazine, benzoxazine, benzoadiazine, pterdine, phenazine, phenothiazine, phenoxazine and acridine.

The ionic liquid may include, for example, one or more solvents selected from the group consisting of the following:

1-Butyl-3-methylpyridinium bromide, 1-Butyl-4-methylpyridinium bromide, 1-Butylpyridinium bromide, 1-Butyl-2-methylpyridinium bromide, 1-Hexylpyridinium bromide, 1-Ethylpyridinium bromide, 1-Propyl-2-methylpyridinium bromide, 1-Propyl-3-methylpyridinium bromide, 1-Propyl-4-methylpyridinium bromide, 1-Propylpyridinium bromide, 1-Ethyl-2-methylpyridinium bromide, 1-Ethyl-3-methylpyridinium bromide, 1-Ethyl-4-methylpyridinium bromide, 1-Ethylpyridinium iodide, 1-Butylpyridinium iodide, 1-Hexylpyridinium iodide, 1-Butyl-2-methylpyridinium iodide, 1-Butyl-3-methylpyridinium iodide, 1-Butyl-4-methylpyridinium iodide, 1-Propylpyridinium iodide, 1-Butyl-3-methylpyridinium chloride, 1-Butyl-4-methylpyridinium chloride, 1-Butylpyridinium chloride, 1-Butyl-2-methylpyridinium chloride, 1-Hexylpyridinium chloride, 1-Butyl-3-methylpyridinium hexafluorophosphate, 1-Butyl-4-methylpyridinium hexafluorophosphate, 1-Butylpyridinium hexafluorophosphate, 1-Ethylpyridinium hexafluorophosphate, 1-Hexylpyridinium hexafluorophosphate, 1-Butyl-2-methylpyridinium hexafluorophosphate, 1-Propylpyridinium hexafluorophosphate, 1-Butyl-2-methylpyridinium trifluoromethanesulfonate, 1-Butyl-3-methylpyridinium trifluoromethanesulfonate, 1-Butyl-4-methylpyridinium trifluoromethanesulfonate, 1-Hexylpyridinium trifluoromethanesulfonate, 1-Butylpyridinium trifluoromethanesulfonate, 1-Ethylpyridinium trifluoromethanesulfonate, 1-Propylpyridinium trifluoromethanesulfonate, 1-Butyl-3-methylpyridinium hexafluorophosphate, 1-Butyl-4-methylpyridinium hexafluorophosphate, 1-Butylpyridinium hexafluorophosphate, 1-Hexylpyridinium hexafluorophosphate, 1-Butyl-2-methylpyridinium hexafluorophosphate, 1-Ethylpyridinium hexafluorophosphate, 1-Propylpyridinium hexafluorophosphate, 1-Ethylpyridinium bis(trifluoromethylsulfonyl)imide, 1-Propylpyridinium bis(trifluoromethylsulfonyl)imide, 1-Butylpyridinium bis(trifluoromethylsulfonyl)imide, 1-Ethyl-3-methylpyridinium bis(trifluoromethylsulfonyl)imide, 3-Methyl-1-propylpyridinium bis(trifluoromethylsulfonyl)imide, 1-Butyl-3-methylpyridinium bis(trifluoromethylsulfonyl)imide, 1-Ethyl-4-methylpyridinium bis(trifluoromethylsulfonyl)imide, 4-Methyl-1-propylpyridinium bis(trifluoromethylsulfonyl)imide, 1-Butyl-4-methylpyridinium bis(trifluoromethylsulfonyl)imide, 1-Butyl-2-methylpyridinium bis(trifluoromethylsulfonyl)imide, 1-Ethyl-2-methylpyridinium bis(trifluoromethylsulfonyl)imde, 2-Methyl-1-propylpyridinium bis(trifluoromethylsulfonyl), 1-Ethyl-3-methylimidazolium methylcarbonate, 1-Butyl-3-methylimidazolium methylcarbonate, 1-Ethyl-3-methylimidazolium tricyanomethanide, 1-Butyl-3-methylimidazolium tricyanomethanide, 1-Ethyl-3-methylimidazolium bis(perfluoroethylsulfonyl)imide, 1-Butyl-3-methylimidazolium bis(perfluoroethylsulfonyl)imide, 1-Ethyl-3-methylimidazolium dibutylphosphate, 1-Butyl-3-methylimidazolium dibutylphosphate, 1-Ethyl-3-methylimidazolium methyl sulfate, 1,3-Dimethylimidazolium methyl sulfate, 1-Ethyl-3-methylimidazolium ethyl sulfate, 1,3-Diethylimidazolium ethyl sulfate, 1,3-Dimethylimidazolium dimethyl phosphate, 1-Ethyl-3-methylimidazolium dimethyl phosphate, 1-Butyl-3-methylimidazolium dimethyl phosphate, 1-Ethyl-3-methylimidazolium diethyl phosphate, 1,3-Diethylimidazolium diethyl phosphate, 1-Butyl-3-methylimidazolium hydrogen sulfate, 1-Ethyl-3-methylimidazolium hydrogen sulfate, 1-Butyl-3-methylimidazolium methanesulfonate, 1-Ethyl-3-methylimidazolium methanesulfonate, 1-Ethyl-3-methylimidazolium tosylate, 1-Ethyl-3-methylimidazolium 1,1,2,2-tetrafluoroethanesulfonate, 1-Methyl-3-propylimidazolium 1,1,2,2-tetrafluoroethanesulfonate, 1-Butyl-3-methylimidazolium 1,1,2,2-tetrafluoroethanesulfonate, 1-Benzyl-3-methylimdiazolium 1,1,2,2-tetrafluoroethanesulfonate, 1-Butyl-3-ethylimidazolium 1,1,2,2-tetrafluoroethanesulfonate, 1-Methylimidazolium 1,1,2,2-tetrafluoroethanesulfonate, 1-Ethylimidazolium 1,1,2,2-tetrafluoroethanesulfonate, 1-Ethyl-3-methylimidazolium thiocyanate, 1-Butyl-3-methylimidazolium thiocyanate, 1-Ethyl-3-methylimidazolium dicyanamide, 1-Butyl-3-methylimidazolium dicyanamide, 1-Allyl-3-methylimidazolium dicyanamide, 1-Benzyl-3-methylimidazolium dicyanamide, 1-Methyl-3-propylimidazolium iodide, 1-Hexyl-3-methylimidazolium iodide, 1-Ethyl-3-methylimidazolium iodide, 1,2-Dimethyl-3-propylimidazolium iodide, 1-Butyl-3-methylimidazolium iodide, 1-Dodecyl-3-methylimidazolium iodide, 1-Butyl-2,3-dimethylimidazolium iodide, 1-Hexyl-2,3-dimethylimidazolium iodide, 1,3-Dimethylimidazolium iodide, 1-Allyl-3-methylimidazolium iodide, 1-Butyl-3-methylimidazolium chloride, 1-Allyl-3-methylimidazolium chloride, 1-(2-Hydroxyethyl)-3-methylimidazolium chloride, 1,3-Didecyl-2-methylimidazolium chloride, 1-Hexyl-3-methylimidazolium chloride, 1-Butyl-2,3-dimethylimidazolium chloride, 1-Decyl-3-methylimidazolium chloride, 1-Methyl-3-octylimidazolium chloride, 1-Ethyl-3-methylimidazolium chloride, 1-Methylimidazolium chloride, 1-Hexadecyl-3-methylimidazolium chloride, 1-Dodecyl-3-methylimidazolium chloride, 1-Benzyl-3-methylimidazolium chloride, 1-Methyl-3-tetradecylimidazolium chloride, 1-Methyl-3-propylimidazolium chloride, 1-Methyl-3-octadecylimidazolium chloride, 1-Ethylimidazolium chloride, 1,2-Dimethylimidazolium chloride, 1-Ethyl-2,3-dimethylimidazolium trifluoromethanesulfonate, 1-Ethyl-3-methylimidazolium trifluoromethanesulfonate, 1-Butyl-3-methylimidazolium trifluoromethanesulfonate, 1-Butyl-2,3-dimethylimidazolium trifluoromethanesulfonate, 1-Decyl-3-methylimidazolium trifluoromethanesulfonate, 1-Hexyl-3-methylimidazolium trifluoromethanesulfonate, 1-Methyl-3-octylimidazolium trifluoromethanesulfonate, 1-Dodecyl-3-methylimidazolium trifluoromethanesulfonate, 1-Methylimidazolium trifluoromethanesulfonate, 1-Ethylimidazolium trifluoromethanesulfonate, 1-Methyl-3-propylimidazolium trifluoromethanesulfonate, 1-Ethyl-3-methylimidazolium acetate, 1-Butyl-3-methylimidazolium acetate, 1-Ethyl-3-methylimidazolium trifluoroacetate, 1-Butyl-3-methylimidazolium trifluoroacetate, 1-Ethyl-3-methylimidazolium nitrate, 1-Methylimidazolium nitrate, 1-Ethylimidazolium nitrate, 1-Butyl-3-methylimidazolium tetrachloroferrate(III), 1-Ethyl-3-methylimidazolium bis(trifluoromethylsulfonyl)imide, 1-Methyl-3-propylimidazolium bis(trifluoromethylsulfonyl)imide, 1-Butyl-3-methylimidazolium bis(trifluoromethylsulfonyl)imide, 1-Hexyl-3-methylimidazolium bis(trifluoromethylsulfonyl)imide, 1-Methyl-3-octylimidazolium bis(trifluoromethylsulfonyl)imide, 1-Decyl-3-methylimidazolium bis(trifluoromethylsulfonyl)imide, 1-Dodecyl-3-methylimidazolium bis(trifluoromethylsulfonyl)imide, 1-Methyl-3-tetradecylimidazolium bis(trifluoromethylsulfonyl)imide, 1-Hexadecyl-3-methylimidazolium bis(trifluoromethylsulfonyl)imide, 1-Butyl-2,3-dimethylimidazolium bis(trifluoromethylsulfonyl)imide, 1-Ethyl-2,3-dimethylimidazolium bis(trifluoromethylsulfonyl)imide, 1,2-Dimethyl-3-propylimidazolium bis(trifluoromethylsulfonyl)imide, 1,3-Diethylimidazolium bis(trifluoromethylsulfonyl)imide, 1,3-Dimethylimidazolium bis(trifluoromethylsulfonyl)imide, 1-Methyl-3-octadecylimidazolium bis(trifluoromethylsulfonyl)imide, 1-Allyl-3-methylimidazolium bis(trifluoromethylsulfonyl)imide, 1-Benzyl-3-methylimidazolium bis(trifluoromethylsulfonyl)imide, 1-Methylimidazolium bis(trifluoromethylsulfonyl)imide, 1-Ethylimidazolium bis(trifluoromethylsulfonyl)imide, 1,2-Dimethylimidazolium bis(trifluoromethylsulfonyl)imide, 1-Ethyl-3-propylimidazolium bis(trifluoromethylsulfonyl)imide, 1-Butyl-3-ethylimidazolium bis(trifluoromethylsulfonyl)imide, 1-Ethyl-3-vinylimidazolium bis(trifluoromethylsulfonyl)imide, 1-Butyl-3-vinylimidazolium bis(trifluoromethylsulfonyl)imide, 1-Methyl-3-pentylimidazolium bis(trifluoromethylsulfonyl)imide, 1-Heptyl-3-methylimidazolium bis(trifluoromethylsulfonyl)imide, 1-Methyl-3-nonylimidazolium bis(trifluoromethylsulfonyl)imide, 1-Butyl-3-methylimidazolium hexafluorophosphate, 1-Hexyl-3-methylimidazolium hexafluorophosphate, 1-Methyl-3-octylimidazolium hexafluorophosphate, 1-Butyl-2,3-dimethylimidazolium hexafluorophosphate, 1-Decyl-3-methylimidazolium hexafluorophosphate, 1-Dodecyl-3-methylimidazolium hexafluorophosphate, 1-Ethyl-3-methylimidazolium hexafluorophosphate, 1-Ethyl-2,3-dimethylimidazolium hexafluorophosphate, 1-Methyl-3-propylimidazolium hexafluorophosphate, 1-Methyl-3-tetradecylimidazolium hexafluorophosphate, 1-Hexadecyl-3-methylimidazolium hexafluorophosphate, 1-Methyl-3-octadecylimidazolium hexafluorophosphate, 1-Benzyl-3-methylimidazolium hexafluorophosphate, 1,3-Diethylimidazolium hexafluorophosphate, 1-Ethyl-3-propylimidazolium hexafluorophosphate, 1-Butyl-3-ethylimidazolium hexafluorophosphate, 1-Methyl-3-pentylimidazolium hexafluorophosphate, 1-Heptyl-3-methylimidazolium hexafluorophosphate, 1-Methyl-3-nonylimidazolium hexafluorophosphate, 1-Ethyl-2,3-dimethylimidazolium tetrafluoroborate, 1-Ethyl-3-methylimidazolium tetrafluoroborate, 1-Butyl-3-methylimidazolium tetrafluoroborate, 1-Hexyl-3-methylimidazolium tetrafluoroborate, 1-Methyl-3-octylimidazolium tetrafluoroborate, 1-(2-Hydroxyethyl)-3-methylimidazolium tetrafluoroborate, 1-Butyl-2,3-dimethylimidazolium tetrafluoroborate, 1-Decyl-3-methylimidazolium tetrafluoroborate, 1-Hexadecyl-3-methylimidazolium tetrafluoroborate, 1-Dodecyl-3-methylimidazolium tetrafluoroborate, 1-Methyl-3-propylimidazolium tetrafluoroborate, 1-Benzyl-3-methylimidazolium tetrafluoroborate, 1-Methyl-3- octadecylimidazolium tetrafluoroborate, 1-Methyl-3-tetradecylimidazolium tetrafluoroborate, 1,3-Diethylimidazolium tetrafluoroborate, 1-Ethyl-3-propylimidazolium tetrafluoroborate, 1-Butyl-3-ethylimidazolium tetrafluoroborate, 1-Methyl-3-pentylimidazolium tetrafluoroborate, 1-Heptyl-3-methylimidazolium tetrafluoroborate, 1-Methyl-3-nonylimidazolium tetrafluoroborate, 1-Ethyl-3-methylimidazolium bromide, 1-Butyl-3-methylimidazolium bromide, 1-Butyl-2,3-dimethylimidazolium bromide, 1-Decyl-3-methylimidazolium bromide, 1-Hexyl-3-methylimidazolium bromide, 1-Methyl-3-octylimidazolium bromide, 1-Methyl-3-propylimidazolium bromide, 1-Dodecyl-3-methylimidazolium bromide, 1-Ethyl-2,3-dimethylimidazolium bromide, 1,2-Dimethyl-3-propylimidazolium bromide, 1-Methylimidazolium bromide, 1-Ethylimidazolium bromide, 1,3-Diethylimidazolium bromide, 1-Ethyl-3-propylimidazolium bromide, 1-Butyl-3-ethylimidazolium bromide, 1-Ethyl-3-vinylimidazolium bromide, 1-Butyl-3-vinylimidazolium bromide, 1-Heptyl-3-methylimidazolium bromide, 1-Methyl-3-nonylimidazolium bromide, 1-(2-Hydroxy-2-methyl-n-propyl)-3-methylimidazolium methanesulfonate, 1-Methyl-1-propylpiperidinium bis(trifluoromethylsulfonyl)imide, 1-Butyl-1-methylpiperidinium bis(trifluoromethylsulfonyl)imide, 1-Butyl-1-methylpiperidinium trifluoromethanesulfonate, 1-Methyl-1-propylpiperidinium trifluoromethanesulfonate, 1-Methyl-1-propylpiperidinium hexafluorophosphate, 1-Butyl-1-methylpiperidinium hexafluorophosphate, 1-Methyl-1-propylpiperidinium tetrafluoroborate, 1-Butyl-1-methylpiperidinium tetrafluoroborate, 1-Methyl-1-propylpiperidinium bromide, 1-Butyl-1-methylpiperidinium bromide, 1-Butyl-1-methylpiperidinium iodide, 1-Methyl-1-propylpiperidinium iodide, 1-Butyl-1-methylpyrrolidinium bis(trifluoromethylsulfonyl)imide, 1-Methyl-1-propylpyrrolidinium bis(trifluoromethylsulfonyl)imide, 1-Methyl-1-octylpyrrolidinium bis(trifluoromethylsulfonyl)imide, 1-Ethyl-1-methylpyrrolidinium bis(trifluoromethylsulfonyl)imide, 1-Butyl-1-methylpyrrolidinium trifluoromethanesulfonate, 1-Methyl-1-propylpyrrolidinium trifluoromethanesulfonate, 1-Ethyl-1-methylpyrrolidinium trifluoromethanesulfonate, 1-Butyl-1-methylpyrrolidinium hexafluorophosphate, 1-Methyl-1-propylpyrrolidinium hexafluorophosphate, 1-Ethyl-1-methylpyrrolidinium hexafluorophosphate, 1-Butyl-1-methylpyrrolidinium tetrafluoroborate, 1-Methyl-1-propylpyrrolidinium tetrafluoroborate, 1-Ethyl-1-methylpyrrolidinium tetrafluoroborate, 1-Butyl-1-methylpyrrolidinium bromide, 1-Methyl-1-propylpyrrolidinium bromide, 1-Ethyl-1-methylpyrrolidinium bromide, 1-Butyl-1-methylpyrrolidinium chloride, 1-Methyl-1-propylpyrrolidinium chloride, 1-Butyl-1-methylpyrrolidinium iodide, 1-Methyl-1-propylpyrrolidinium iodide, 1-Ethyl-1-methylpyrrolidinium iodide, 1-Butyl-1-methylpyrrolidinium dicyanamide, 1-Methyl-1-propylpyrrolidinium dicyanamide, 1-Butyl-1-methylpyrrolidinium 1,1,2,2-tetrafluoroethanesulfonate, 1-Methyl-1-propylpyrrolidinium 1,1,2,2-tetrafluoroethanesulfonate, 1-Butyl-1-methylpyrrolidinium methylcarbonate, 1-Butyl-1-methylpyrrolidinium tricyanomethanide, Methyltrioctylammonium bis(trifluoromethylsulfonyl)imide, Butyltrimethylammonium bis(trifluoromethylsulfonyl)imide, Choline bis(trifluoromethylsulfonyl)imide, Tributylmethylammonium bis(trifluoromethylsulfonyl)imide, Ethylammonium nitrate, Methylammonium nitrate, Propylammonium nitrate, Dimethylammonium nitrate, Butyltrimethylammonium methylcarbonate, Methyltrioctylammonium methylcarbonate, N-Ethyl-N-methylmorpholinium methylcarbonate, N,N-Diethyl-N-methyl-N-(2-methoxyethyl)ammonium bis(trifluoromethylsulfonyl)-imide, N,N-Diethyl-N-methyl-N-(2-methoxyethyl) ammonium tetrafluoroborate, Butyltrimethylammonium 1,1,2,2-tetrafluoroethanesulfonate, Tetraethylammonium 1,1,2,2-tetrafluoroethanesulfonate, 2-Hydroxyethylammonium formate, Choline dihydrogen phosphate, Methyltrioctylammonium trifluoromethanesulfonate, Trihexyltetradecylphosphonium bromide, Tetrabutylphosphonium bromide, Tetraoctylphosphonium bromide, Trihexyltetradecylphosphonium chloride, Tributyltetradecylphosphonium chloride, Tributylmethylphosphonium methylcarbonate, Trioctylmethylphosphonium methylcarbonate, Trihexyltetradecylphosphonium decanoate, Trihexyltetradecylphosphonium bis(2,4,4-trimethylpentyl)phosphinate, Trihexyltetradecylphosphonium dicyanamide, Triisobutylmethylphosphonium tosylate, Trihexyltetradecylphosphonium hexafluorophosphate, Tributylmethylphosphonium methyl sulfate, Tetrabutylphosphonium chloride, Ethyltributylphosphonium diethyl phosphate, Tributyltetradecylphosphonium dodecylbenzenesulfonate, Trihexyltetradecylphosphonium bis(trifluoromethylsulfonyl)imide, Tributylmethylphosphonium 1,1,2,2-tetrafluoroethanesulfonate, Triethylsulfonium bis(trifluoromethylsulfonyl)imide, Diethylmethylsulfonium bis(trifluoromethylsulfonyl)imide, Triethylsulfonium iodide and Trimethylsulfonium iodide.

In the sodium secondary battery according to an exemplary embodiment of the present invention, the solvent of the catholyte may further contain a different kind of solvent compatible with the above described solvent, and such different kind of solvent may include, for example, one or more solvents selected from the group consisting of the following:

ethylene carbonate, propylene carbonate, 1,2-butylene carbonate, 2,3-butylene carbonate, 1,2-pentylene carbonate, 2,3-pentylene carbonate, vinylene carbonate, dimethyl carbonate, diethyl carbonate, di(2,2,2-trifluoroethyl) carbonate, dipropyl carbonate, dibutyl carbonate, ethylmethyl carbonate, 2,2,2-trifluoroethyl methyl carbonate, methylpropyl carbonate, ethylpropylcarbonate, 2,2,2-trifluoroethyl propyl carbonate, methyl formate, ethyl formate, propyl formate, butyl formate, dimethyl ether, diethyl ether, dipropyl ether, methylethyl ether, methylpropyl ether, ethylpropyl ether, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, γ-thiobutyrolactone, γ-ethyl-γ-butyrolactone, β-methyl-γ-butyrolactone, γ-valerolactone(γ-valerolactone), σ-valerolactone, γ-caprolactone(γ-caprolactone), ε-caprolactone, β-propiolactone, tetrahydrofuran, 2-methyl tetrahydrofuran, 3-methyltetrahydrofuran, trimethyl phosphate(trimethyl phosphate), triethyl phosphate, tris(2-chloroethyl) phosphate, tris(2,2,2-trifluoroethyl)phosphate, tripropyl phosphate, triisopropyl phosphate, tributyl phosphate, trihexyl phosphate, triphenyl phosphate, tritolyl phosphate, methyl ethylene phosphate, ethyl ethylene phosphate, dimethyl sulfone(dimethyl sulfone), ethyl methyl sulfone, methyl trifluoromethyl sulfone, ethyl trifluoromethyl sulfone, methyl pentafluoroethyl sulfone, ethyl pentafluoroethyl sulfone, di(trifluoromethyl)sulfone, di(pentafluoroethyl) sulfone, trifluoromethyl pentafluoroethyl sulfone, trifluoromethyl nonafluorobutyl sulfone, pentafluoroethyl nonafluorobutyl sulfone, sulfolane(sulfolane), 3-methylsulfolane, 2-methylsulfolane, 3-ethylsulfolane and 2-ethylsulfolane.

In the sodium secondary battery according to an exemplary embodiment of the present invention, the anode may include an anode active material containing sodium, and the anode active material may contain a sodium metal or a sodium alloy. As a non-limited example, the sodium alloy may be sodium and cesium, sodium and rubidium or the mixtures thereof. The anode active material may be in a liquid state including a solid state or a melted state at battery operating temperature. Herein, in order to obtain 50 Wh/kg or more of a battery capacity, the anode active material may be molten sodium, and a battery operating temperature may be 98° C. to 200° C., substantially 98° C. to 150° C., more substantially 98° C. to 130° C.

In the sodium secondary battery according to an exemplary embodiment of the present invention, a sodium ion conductive solid electrolyte equipped between the cathode and the anode physically separates the cathode and the anode. It may be any material having selective conductivity for sodium ions, and for selective conduction of sodium ions, a generally used solid electrolyte in the battery field will be fine. As a non-limited example, the solid electrolyte may be sodium super ionic conductor (NaSICON), β-alumina or β"-alumina. As a non-limited example, NASICON may include Na—Zr—Si—O-based composite oxide, Na—Zr—Si—P—O-based composite oxide, Y-doped Na—Zr—Si—P—O-based composite oxide, Fe-doped Na—Zr—Si—P—O-based composite oxide or the mixtures thereof, and specifically, may include $Na_3Zr_2Si_2PO_{12}$, $Na_{1-x}Si_xZr_2P_{3-x}O_{12}$ (x is a real number and 1.6<x<2.4), Y or Fe-doped $Na_3Zr_2Si_2PO_{12}$, Y or Fe-doped $Na_{1+x}Si_xZr_2P_{3-x}O_{12}$ (x is a real number and 1.6<x<2.4) or the mixtures thereof.

The sodium secondary battery according to the present invention may provide a large reaction area, simultaneously with being impregnated with a large amount of electrolyte (catholyte), prevent capacity reduction to the battery caused by permanent removal of an active material from a current collector, maintain the large reaction area stably during charge-discharge reaction, and have a stable charge/discharge cycle characteristic, by a graphite felt having a maximum porosity on the surface facing a solid electrolyte and a decreased porosity in a thickness direction. In addition, the sodium secondary battery according to an exemplary embodiment of the present invention configured to include an anode containing sodium, a solid electrolyte having selective conductivity for sodium ions, and a catholyte containing a solvent dissolving a cathode active metal halide, may operate at low temperature of room temperature to 200° C., significantly increase a battery capacity, as an electrochemical reaction of the battery is carried out by the cathode active metal halide and sodium halide solubilized in the catholyte, significantly improve a charge/discharge rate of the battery by increasing active area where the electrochemical reaction is carried out, and prevent an increase of internal resistance of the battery.

Hereinabove, although the present invention is described by specific matters, limited exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:
1. A sodium secondary battery comprising:
   a sodium ion conductive solid electrolyte separating an anode space and a cathode space;
   an anode positioned in the anode space and containing sodium; and
   a cathode current collector positioned in the cathode space and containing two or more graphite felts having different porosities stacked on top of each other in order of porosity from high to low so as for a graphite felt having a maximum porosity to face a solid electrolyte and a decreased porosity in a thickness direction of the cathode current collector,
   wherein the cathode current collector has a material migration pore provided by a stack of the two or more graphite felts and is impregnated with catholyte positioned in the cathode space; and
   wherein a porosity of the cathode current collector originated from the stack of the two or more graphite felts is maximum on a surface facing the solid electrolyte and decreased in a thickness direction.

2. The sodium secondary battery of claim 1, wherein the stack of the two or more graphite felts has a porosity discontinuously decreased in a thickness direction.

3. The sodium secondary battery of claim 1, wherein a difference between the maximum porosity (%) and the minimum porosity (%) in the stack of the two or more graphite felts is 1% to 98%.

4. The sodium secondary battery of claim 3, wherein the graphite felt has the maximum porosity of 2% to 99%.

5. The sodium secondary battery of claim 1, further comprising a cylindrical metal case of which one end is closed and the other end is open, and a cover coupled with the open end of the metal case, wherein the cathode space and the anode space are separated by a tubular solid electrolyte of which one end is closed inserted into the metal case.

6. The sodium secondary battery of claim 1, wherein a facing surface of the surface facing the solid electrolyte of the cathode current collector contacts the metal case.

7. The sodium secondary battery of claim 6, wherein cathode current collector has a cylindrical shape having a hollow, and the tubular solid electrolyte is positioned in the hollow.

8. The sodium secondary battery of claim 7, wherein the stack of the two or more graphite felts has a porosity decreased in a direction from a surface of the hollow side to an outer side surface.

9. The sodium secondary battery of claim 1, further comprising a cathode including a transition metal adhered to or supported in the graphite felt.

10. The sodium secondary battery of claim 1, wherein the catholyte includes a metal halide which is a halide of at least one metal selected from a group consisting of transition metals and metals from Group 12 to Group 14; and a solvent dissolving the metal halide.

11. The sodium secondary battery of claim 10, wherein metal ions of the metal halide contained in the catholyte are electrodeposited on the cathode current collector as the metals at the time of being discharged, and the metals electrodeposited on the cathode current collector are dissolved into the catholyte as the metal ions at the time of being charged.

\* \* \* \* \*